United States Patent
Welden

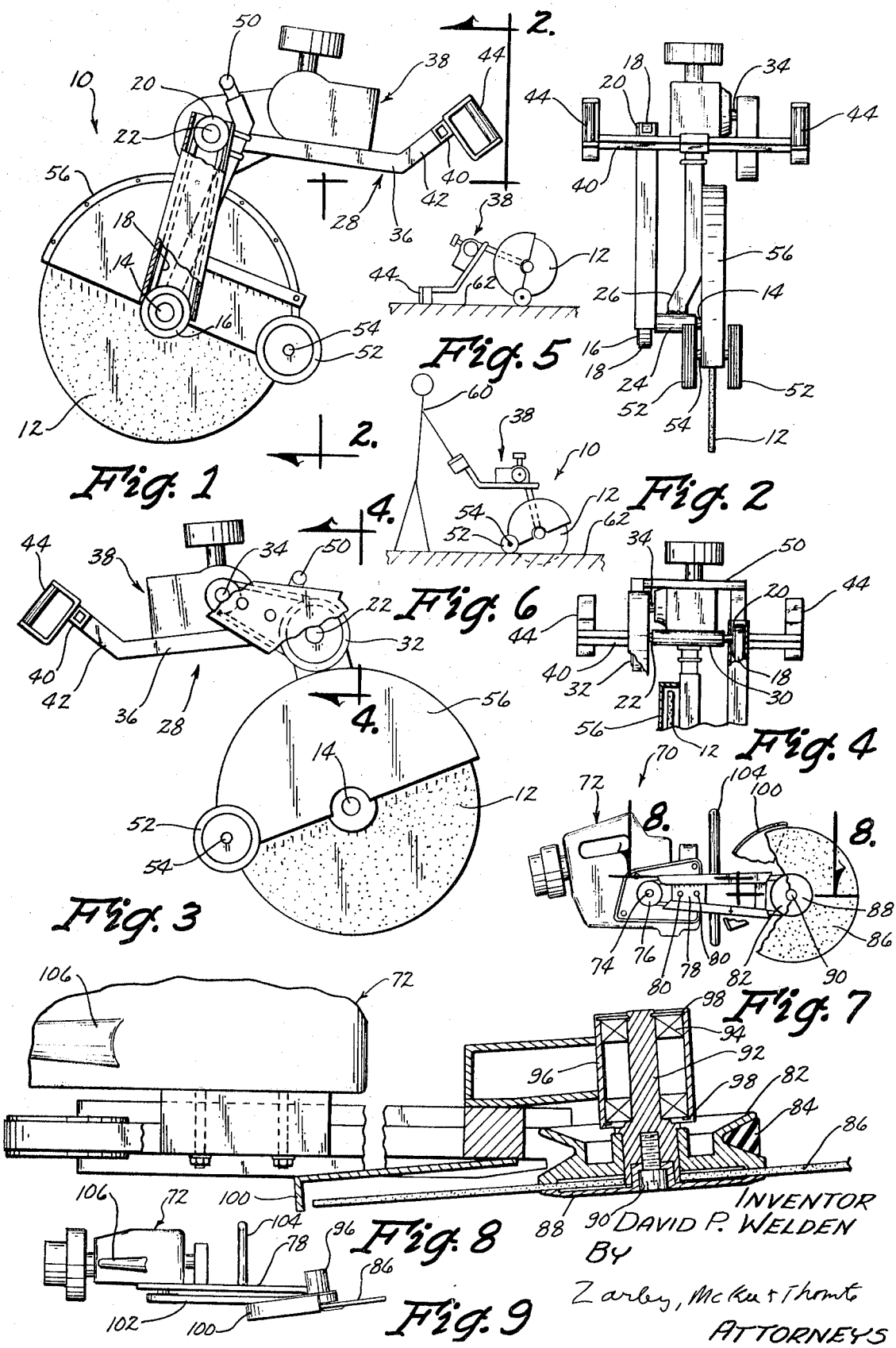

[15] 3,656,468
[45] Apr. 18, 1972

[54] MASONRY SAW

[72] Inventor: David P. Welden, North Indiana Avenue, Iowa Falls, Iowa 50126

[22] Filed: May 4, 1970

[21] Appl. No.: 34,000

[52] U.S. Cl. .......................................... 125/13, 51/170 PT
[51] Int. Cl. ................................... B24b 23/00, B28d 1/04
[58] Field of Search .................... 51/170 R, 170 PT; 30/167; 172/13; 125/13

[56] References Cited

UNITED STATES PATENTS

| | | | |
|---|---|---|---|
| 3,382,578 | 5/1968 | Dobbertin | 30/167 |
| 2,700,256 | 1/1955 | Lewis | 51/170 PT |
| 3,055,438 | 9/1962 | Wood et al. | 172/15 |
| 2,680,945 | 6/1954 | Reed | 172/14 |
| 2,767,541 | 10/1956 | Yacoby | 172/15 |
| 3,168,147 | 2/1965 | Peters | 172/15 |
| 2,882,977 | 4/1959 | Smith et al. | 172/15 |
| 1,519,921 | 12/1924 | Lange | 51/168 |
| 2,384,253 | 9/1945 | Jearum | 51/168 |
| 3,422,578 | 1/1969 | Mossman et al. | 51/168 |
| 1,861,903 | 6/1932 | Bellando | 51/168 |

*Primary Examiner*—William R. Armstrong
*Attorney*—Zarley, McKee & Thomte

[57] ABSTRACT

A masonry saw having an engine mounted on one leg of an L-shaped frame with the saw blade being connected to the other leg. A pair of depth wheels are mounted on a guard on the blade and provide a pivot axis for moving the saw between an at rest position and an operational position. The engine is located on the frame in such a position that it will tend to maintain the blade in cutting contact with the work piece in the operational position and in the at rest position maintain the blade out of engagement with the work piece. A modified saw includes a blade remote from the engine and on the opposite side of a frame connected to the engine such that the blade which is misaligned approximately 5° will cut flush against a work piece without interference by any of the structure of the saw equipment.

3 Claims, 9 Drawing Figures

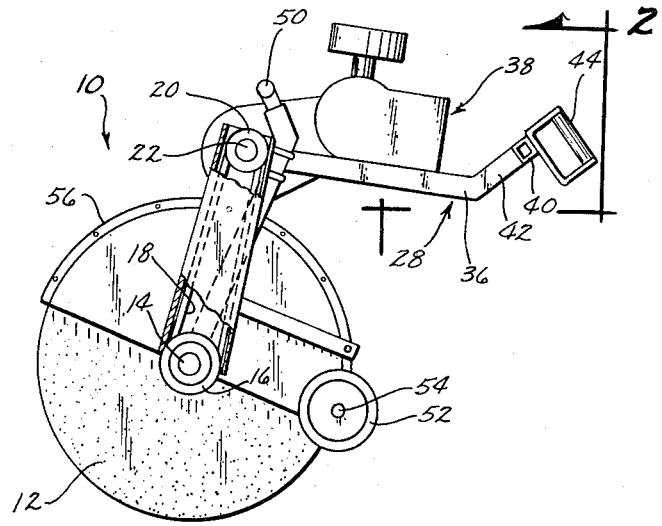

MASONRY SAW

The masonry saws available heretofore have been large in size and heavy to operate. Accordingly, the saw of this invention is portable, light weight and easy to operate.

The larger saw of this invention is movable on a pair of depth control wheels connected to a blade guard in turn connected to a downwardly extending frame portion a part of an L-shaped frame wherein the engine is carried on the other leg of the L-shaped frame. The operator can guide the blade into the work piece by pivoting the saw about the axis of the depth control wheels and may pivot the saw to an inoperative position with the handles on the other leg of the L-shaped frame engaging the ground. In operation the blade and the depth control wheels engage the supporting surface or work piece. The engine is located appropriately to maintain appropriate balance in the operating position and the at rest position to assist in maintaining the saw in these positions.

An alternate embodiment of the saw of this invention employing a similar engine and drive arrangement includes a belt drive pulley connected directly to the saw blade on the opposite side of a frame connected to the engine and the blade and its extended plane are disposed at approximately an angle of 5° relative to the frame such that the blade may be placed flush against the work piece unencumbered by the saw frame or engine or other structural components thereby making it possible to cut work pieces that heretofore could not be cut.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a side elevational view of the walking saw unit.

FIG. 2 is an end elevational view taken along line 2 — 2 in FIG. 1.

FIG. 3 is a side elevational view showing the opposite side from that seen in FIG. 1, a portion of it being broken away for clarity purposes.

FIG. 4 is a fragmentary end elevational view taken along line 4 — 4 in FIG. 3.

FIGS. 5 and 6 are reduced in scale diagrammatic views showing the saw in its two positions.

FIG. 7 is a fragmentary side elevational view of an alternate embodiment saw which is smaller and has a blade positioned out of alignment with the longitudinal axis of the saw to provide for close cutting of a work piece.

FIG. 8 is an enlarged cross-sectional view taken along line 8 — 8 in FIG. 7; and FIG. 9 is a top plan view of the saw as seen in FIG. 7.

The saw of this invention seen in FIGS. 1 – 6 is referred to in FIG. 1 by the reference numeral 10. A masonry-type cutting blade 12 is mounted on a shaft 14 connected to a belt sheave 16 driven by a belt 18 in turn connected to a sheave 20 on a shaft 22. The shaft 14 extends through a sleeve 24 welded to the outer end of a frame portion 26 included in an L-shaped frame 28. The shaft 22 is also received in a sleeve 30 as seen in FIG. 4 and has a sheave 32 connected thereto which is in turn connected to an engine drive shaft 34.

The L-shaped leg frame portion 26 extends at an angle slightly in excess of 90° relative to the other L-shaped leg portion 36 which carries a chain saw type engine 38 thereon. A cross frame portion 40 is provided on an upturned portion 42 of the frame portion 36 and includes handle portion 44 at opposite ends thereof.

A second handle 50 is secured to the frame portion 26 at its upper end.

A pair of depth control wheels 52 are mounted on an axle 54 rigidly secured to the blade guard 56 to permit controlling the depth of the cutting action of the blade as seen in FIG. 6 by the operator 60 pivoting the saw 10 about the pivotal axis of the shaft 54 extending through the depth control wheels 52. Additionally, the saw may be pivoted to a nonuse position as seen in FIG. 5 wherein the handles 44 engage the wheel support ground surface 62 and the cutting blade 12 is above the ground surface 62. The engine 38 in the position of use of FIG. 6 tends to assist in maintaining the blade 12 in cutting engagement with the work piece or ground surface 62 while when the saw is pivoted to the nonuse position of FIG. 5, the weight of the engine 38 helps to maintain it in this position since its center of gravity is shifted relative to the pivotal axis through the depth control wheels 52.

Preferably, the portable saw 10 will have a 24 inch in diameter saw blade permitting 10 inch cutting depth which allows wear of 4 inches off of the blade leaving a cutting blade which will cut an 8 inch depth. This saw may be powered by chain saw type engines having 13 ½ horsepower. The entire saw will weigh only 70 pounds. The blade will turn at approximately 2,200 r.p.m.

An alternate embodiment of the saw of FIGS. 1 – 6 is shown in FIGS. 7, 8 and 9 and is referred to generally in FIG. 7 by the reference numeral 70. A chain saw type engine such as those made by McMulloch is indicated by the reference numeral 72 and includes an output transversely extending drive shaft 74 having a sheave 76 thereon. A frame 78 is secured to the engine by bolts 80 and includes an outer sheave 82 about which a V-belt 84 extends and embraces the drive sheave 76 on the engine 72.

A masonry-type blade 86 is attached directly to the outer surface of the sheave 82 by a slip clutch type friction plate 88 held in place by a threaded bolt 90 engaging a shaft 92 extending through bearings 94. A housing 96 encloses the bearings and shaft and includes snap rings 98 to hold the shaft 92 in place.

A blade guard 100 is secured to the frame 78 in addition to a belt guard 102. A handle 104 forwardly of the engine 72 extends perpendicular to the frame 78 and in the opposite direction from the cutting blade 86. Thus the engine 72 having a handle 106 taken with the handle 104 provides sufficient control over the saw for the operator.

The critical part of this saw is in the arrangement of the blade 86 relative to the frame 78 and the engine 72 and handle 104. As seen in FIGS. 8 and 9 the blade 86 is in a plane completely outside of any of the other saw structure such that it may be placed flush against a work piece without interference from any of the other saw component parts which are all on the opposite side of the frame 78. The only spacing limitation from the work piece is that resulting from the clamp plate 88 securing the blade to the sheave 82 and this is very thin and thus being of no practical consequence. Additionally, the shaft 92 on which the blade 86 turns is misaligned approximately 5° or at least within a range of 2° to 10° to further facilitate close cutting to a work piece free of interference from the saw frame or engine as well as the drive sheaves and belt.

Thus it is seen in operation that the saw of FIGS. 7, 8 and 9 can be placed with its blade 86 flush against a substantial flat surface to cut perpendicular work pieces therefrom flush against the flat surface since the blade can be maintained in intimate contact with the flat surface throughout the full cutting operation. At no time will any of the saw structure interfere with the travel of the saw over the piece being cut. The operator is able to maintain complete control over the saw through the handle on the engine and the forward handle on the frame.

I claim:

1. A masonry saw comprising, a power unit having a longitudinal axis and a laterally extending output drive shaft, an inner sheave on said drive shaft operatively connected by a belt means extending parallel to said longitudinal axis to an outer sheave located remotely therefrom, a circular blade connected to said outer sheave, said power unit is secured to a frame unit having a pair of frame portions forming a substantially L-shaped frame unit, one of said frame portions having laterally spaced apart handle portions on the outer end thereof and the other frame portion having said outer sheave and circular blade on its outer end, a blade guard extending over said blade and having depth control wheels on opposite sides thereof on the side of said other frame portion adjacent said one frame portion said power unit and depth control wheels being located such that when said frame unit is in a raised position the lowest point on said blade is above the surface supporting said depth control wheels and said handle portions are in engagement with the wheel supporting surface, and when said frame unit is in an operating position the weight of the masonry saw tends to pivot it forwardly away from the operator whereby said blade is in engagement with the supporting surface and is at least as low as said depth control wheels, and said saw is pivotable between said raised and operating positions about the axis of rotation of said depth control wheels.

2. The structure of claim 1 wherein said belt means and sheave on said drive shaft and said outer sheave are further defined as including a first transversely extending shaft having sheaves at opposite ends adjacent the juncture of said pair of frame portions and a second transversely extending shaft on the outer end of said other frame portion, a first belt extending from said inner sheave on said drive shaft to a sheave on said first shaft, said first shaft having a sheave on the opposite side of said other frame portion and a belt extends therefrom to said outer sheave on said other shaft having said blade secured thereto on the opposite side of said other frame portion from said outer sheave.

3. The structure of claim 2 wherein said first and second shafts are each received in sleeves rigidly secured to said pair of frame portions and extending transversely thereof.

* * * * *